United States Patent [19]
Wenger

[11] 3,801,008
[45] Apr. 2, 1974

[54] CLIMATIC CONTROL ESPECIALLY FOR ANIMAL BUILDINGS

[76] Inventor: Caleb M. Wenger, R.D. 1, Quarryville, Pa. 17566

[22] Filed: Dec. 11, 1972

[21] Appl. No.: 314,017

Related U.S. Application Data

[63] Continuation-in-part of Ser. No. 250,986, May 8, 1972, abandoned.

[52] U.S. Cl.................. 236/46, 165/16, 236/49, 318/471
[51] Int. Cl.......................... F24f 7/02, H01r 29/00
[58] Field of Search ............... 236/49, 46; 318/471; 200/61.04; 340/235; 165/16

[56] References Cited
UNITED STATES PATENTS
2,499,544  3/1950  Vancil............................. 236/49 X
3,329,341  7/1967  Jones............................. 236/49 X Primary Examiner—William E. Wayner
Attorney, Agent, or Firm—Jackson, Jackson and Chovanes

[57] ABSTRACT

The present invention involves a climatic control for ventilation of the roof of buildings, particularly animal buildings. The system involves a thermostatic switch which discriminates between winter and summer positions. In the winter position it operates a control including a sensing variable resistor, which may for example change its resistance with change of sunlight, temperature, wind velocity, wind direction or evaporation. In the summer it connects with a timer switch which at night maintains the venting louvers open, unless they are closed by a rain switch. In the day the timer switch maintains the venting louvers closed or nearly closed. This is applied particularly to an animal building, preferably of the type which has venting louvers in a sloping roof directed toward the south.

7 Claims, 5 Drawing Figures

CLIMATIC CONTROL ESPECIALLY FOR ANIMAL BUILDINGS

This application is a continuation-in-part of application Ser. No. 250,986, filed May 8, 1972, now abandoned, for CLIMATIC CONTROL ESPECIALLY FOR ANIMAL BUILDINGS.

The present invention is a climatic control, preferably for venting and otherwise affecting an animal building by opening and closing louvers in the roof, in response to summer and winter, the presence or absence of sunlight, or a critical temperature, a wind of a particular direction, a wind of a particular velocity, and the presence or absence of precipitation, herein referred to generically as rain.

The invention is preferably applied to ridge roof buildings (called coupled rafter roofs in the Encyclopedia Britannica) in which one or both sides of the sloping roof has louvers. The side having louvers will preferably be oriented toward the south and will preferably more steeply slope than the other side of the sloping roof from the ridge as explained more in detail in U.S. Pat. No. 3,556,055 issued Jan. 19, 1971 for BUILDING FOR ANIMALS and United States patent application Ser. No. 104,976, filed Jan. 8, 1971 for BUILDING FOR ANIMALS, incorporated herein by reference.

The invention involves a thermostatic switch which disposes the control circuit in winter mode or summer mode of operation. In the winter mode of operation a special electronic circuit including a sensing resistor, transistor switching units which produce an output depending upon the resistance of the sensor resistor, a relay responding to the output and a servomechanism such as a reversing motor and drum which operates the louver covers are actuated. In the summer mode of operation a timer switch is utilized which discriminates between night and day. In the night mode of summer operation the venting louvers are opened unless closed by a rain switch, all operating through suitable relays and servomechanism. In the day mode of operation the venting louvers are closed through a suitable relay and servomechanism.

In the winter mode of operation a controlled delay is interposed by an electronic timer, having a timer capacitor and timer resistors in series and in parallel relation to the timer capacitor, and controlling the voltage which operates the transistor switching unit.

In the drawings I have shown a preferred embodiment of the invention.

Figure 2:
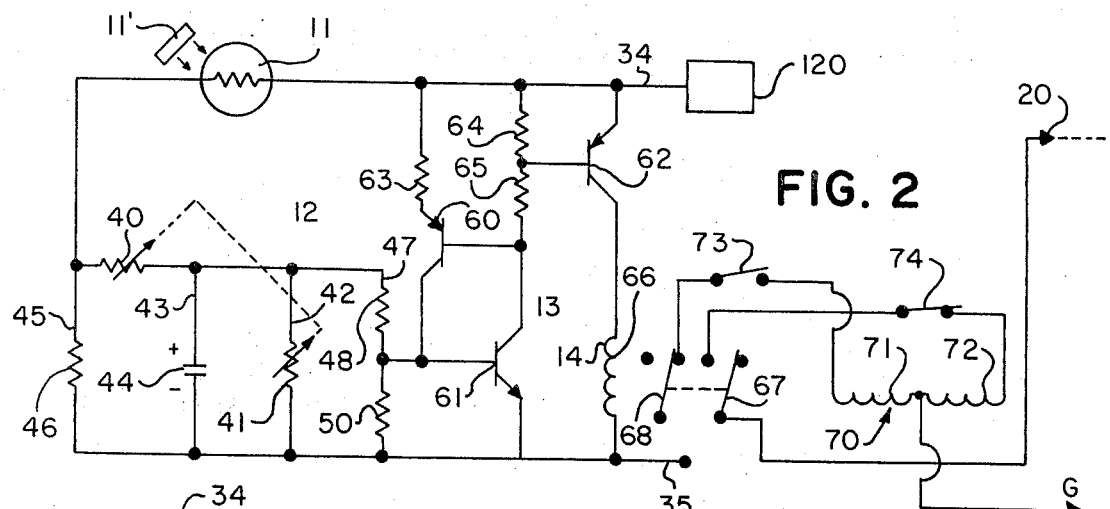
FIG. 2 is an illustrative electrical diagram of the winter control unit used in the invention.

The device includes in its main parts a power pack 10, a thermostatic switch 120, a sensor, preferably a photoresistor 11, a time delay network 12, a transistor switching device 13, a relay 14, a timer switch 124 and a rain switch 132.

Figure 1:
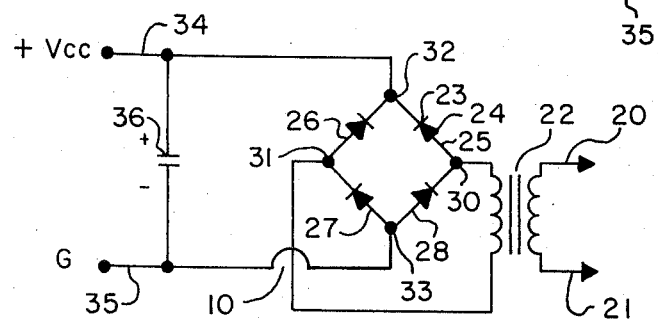
FIG. 1 is an illustrative electrical diagram of the power pack used for the control of the invention.

FIG. 1 shows the power pack for operation of the low voltage controls and relays.

Figure 2A:
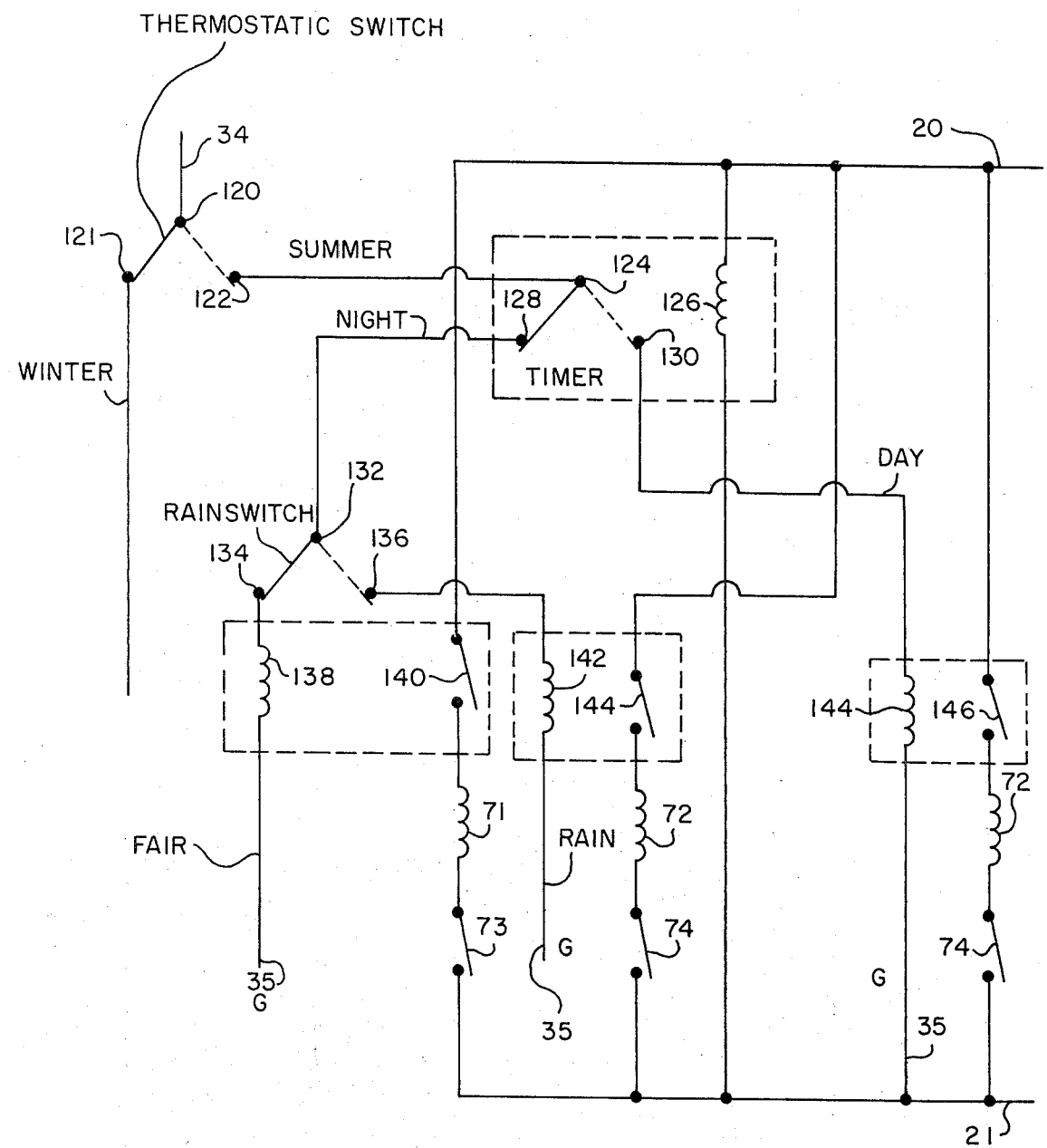
FIG. 2a is an illustrative electrical diagram of the thermostatic switch which discriminates between winter and summer, the timer switch for summer operation, the rain switch and the relays and servomechanism associated therewith.

FIG. 2 shows the control unit for winter operation, and FIG. 2a shows the thermostatic switch, timer switch and rain switch which make automatic operation in the summer possible.

It will be evident that different sensors can be substituted for the sensor 11 (instead of the photoresistor); for example, it can be replaced by a temperature sensitive resistor or a wind pressure switch or a resistor which varies the resistance with wind pressure, or a wind direction indicator. The sensor can be exposed at any convenient place where it will respond to the presence or absence of the sun or other controlling quantity.

Taking the current from suitable AC power leads 20 and 21, FIG. 1, the voltage is stepped down by transformer 22 and it energizes a full wave rectifier 23, suitably a silicon rectifier, having four rectifier units positioned with their cathodes 24 in sequence around the branches of the rectifier network, which may be designated 25, 26, 27 and 28.

Between branches 28 and 25 is terminal 30 to which one side of the transformer secondary is connected to terminal 31 between branches 26 and 27. Rectified current is taken off at terminal 32 (plus) between branches 25 and 26 and at terminal 33 between branches 27 and 28 and the rectified current supplies leads 34 and 35 (which may be grounded), shunted by filtering capacitor 36.

FIG. 2a shows part of the circuit for control as to whether it shall operate in the winter mode or in the summer mode. The thermostatic switch 120 which is connected to the terminal 34 in FIG. 1 has a winter position in which it closes contact 121 and a summer position in which it closes contact 122. When it is in the winter position, it energizes terminal 34' in FIG. 2, which will not be described.

In FIG. 2, connected to lead 34, in series therewith, is the resistor of the sensor unit 11 just described, and also timer network 12 which is connected across to ground. The timer network involves a potentiometer having resistors 40 and 41 adjustable in unison, the resistor 40 being connected to the opposite side of the sensor resistor from the power lead 34, and the resistor 41 being connected in a branch 42 of a group of parallel branches across to the ground and in series with the resistor 40.

Another branch 43 is in series with the resistor 40 but in parallel with the branch 42 and contains capacitor 44 whose charge and discharge controls the time delay.

Also in parallel with the branches 42 and 43 but not in series with the resistor 40 is branch 45 which includes fixed resistor 46 connected to ground. In parallel with branch 42 and 43 and in series with resistor 40 is branch 47 having resistors 48 and 50.

The transistor switching unit 13 includes three transistors 60, 61 and 62, which may be of general purpose switching transistors, of which transistors 60 and 62 are PNP type and transistor 61 is of the NPN type. Transistors 60 and 61 are the main switching transistors and transistor 62 matches the impedance of the relay. The transistor 60 has its emitter connected through resistor 63 to the power lead 34 and has its collector connected to an intermediate point between resistors 48 and 50. The transistor 61 has its emitter connected to ground through the power lead 35 and its base connected to the intermediate point between resistors 48 and 50. The base of transistor 60 is connected to power lead 34 through resistors 64 and 65 which are in series and are connected to the collector of transistor 61.

Thus in each of the switching transistors 60 and 61, on the input side connection is made to the collector of the PNP transistor and to the base of the NPN transistor and on the output side connection is made to the collector of the NPN transistor and to the base of the PNP transistor. The emitter of the PNP transistor is connected to the high side of the power source, and the emitter of the NPN transistor is connected to the low side of the power source.

Transistor 62 has its base connected intermediate between resistors 64 and 65, has its emitter connected to the high side 34 of the power line and its collector connected to one side of the coil 66 of relay 14, the other side of which is connected to power lead 35 and ground.

Relay 14 has two switching circuits 67 and 68 and energization of the relay closes one of these circuits and opens the other of these circuits and vice versa. An electric motor 70 which may be of the induction type has two opposed field coils 71 and 72, respectively in the circuit 67 or 68 in series with limit switches 73 and 74 to be described, which are of the type in which one is always open when the other is closed. The intermediate point between the field coil 71 and 72 is connected to the power lead 21 and to ground, and the high side of the circuits 67 and 68 is connected to the power lead 20.

In the summer position as seen in FIG. 2a, when contact 122 is closed timer switch 124 is energized by coil 126 connected between power leads 20 and 21. The timer switch closes contact 128 for night operation and contact 130 for day operation. In night operation it energizes rain switch 132 which closes contact 134 if the weather is fair and closes contact 136 if there is any precipitation. If contact 134 is closed for fair weather operation, relay coil 138 is energized across to ground 35 and this closes relay contacts 140 in a vent coil circuit across between power lead 20 and power lead 21 through vent coil 71 and limit switch 73 which is described elsewhere, and which will be closed if vent coil 71 is operative to maintain the venting louvers open.

If there is rain, contact 136 is closed, which energizes relay 142 closing relay contacts 144 which energizes vent coil 72 connected across between power leads 20 and 21 if the limit switch 74 is closed, as it will be if the venting louvers are in the position in which vent coil 72 is operative.

If the timer switch 124 is in daytime operation it closes contact 130, energizing relay coil 144 across to ground, which closes relay contacts 146 and energizes vent coil 72 between power leads 20 and 21, providing limit switch 74 is closed, as it will be if the venting louvers are in the position in which vent coil 72 is operative. This closes the venting louvers or nearly closes them as desired.

MODE OF OPERATION

The thermostatic switch 120 determines whether the operation is on the winter or the summer mode.

If the operation is on the winter mode, then what immediately follows applies.

When the sensing unit is dark (when a photoresistor of selenium type is used), it will be of high resistance and therefore it actuates the voltage divider provided by the timer network in such a way that the timer is subjected to a low voltage. This particular mode forming part of the overall winter mode discharges any residual charge on the capacitor such that the timer comes to a steady state and remains stable until such time that the sensor conditions change. The voltage output of the timer is monitored by the transistor switching unit 13. Under this condition the minimum threshold voltage of the switching unit is realized; hence, the switch is in an off mode, and the relay is not energized. When sun comes to the sensor 11, through filter 11', it vastly reduces its resistance and vastly increases the voltage on the voltage divider and the timer network 12. With the high voltage increase on the timer network, the capacitor will charge until such time that the output of the timer network again being monitored by the switching unit passes a switch threshold voltage and thereby triggers the switching unit into an on mode and therefore triggers the relay on, which starts the electric motor 70. The time delay on it equal to the time delay off and equals the time which it takes for the charge or discharge of the capacitor to adjust from one mode to another.

Adjusting the values of the potentiometer resistors 40 and 41 changes the time delay. This increase of the resistors 40 and 41 lengthens the time delay, and decrease of the resistors 40 and 41 reduces the time delay.

In case instead of a photoresistor the sensing resistor 11 is a thermistor or other temperature measuring device the functioning will be the same. In case the sensing unit is a wind pressure indicator which has two modes of operation, one a high resistor and one a low resistor as accomplished for example by mechanical switching in the wind indicator, the method will be the same. Similarly, the sensor 11 can be a wind direction indicator which by mechanical switching therein reduces or increases the resistance of the sensor 11 and exerts control.

While in the invention I have shown a timer which delays the actuation of the transistor switching unit so that the device will not respond to a momentary change in sunlight, temperature or wind characteristics, it will be evident that in the broadest aspects of the invention the change in response of the sensing unit may directly operate the transistor sensing unit without the delay.

If the thermostatic switch 120 determines to operate on the summer mode of operation, then the timer switch 124, which is continuously keeping time, has its appropriate contact energized. If it determines that night operation prevails, it opens the venting louvers by relay 138 and vent coil 71 unless the rain switch 132 indicates precipitation in which case relay 142 and relay contacts 144 energize vent coil 72 to close the venting louvers. If the timer switch 124 determines that daytime operation is appropriate, then relay coil 144 is energized to close relay contacts 146 and to energize vent coil 72 to close the venting louvers.

Figure 3:
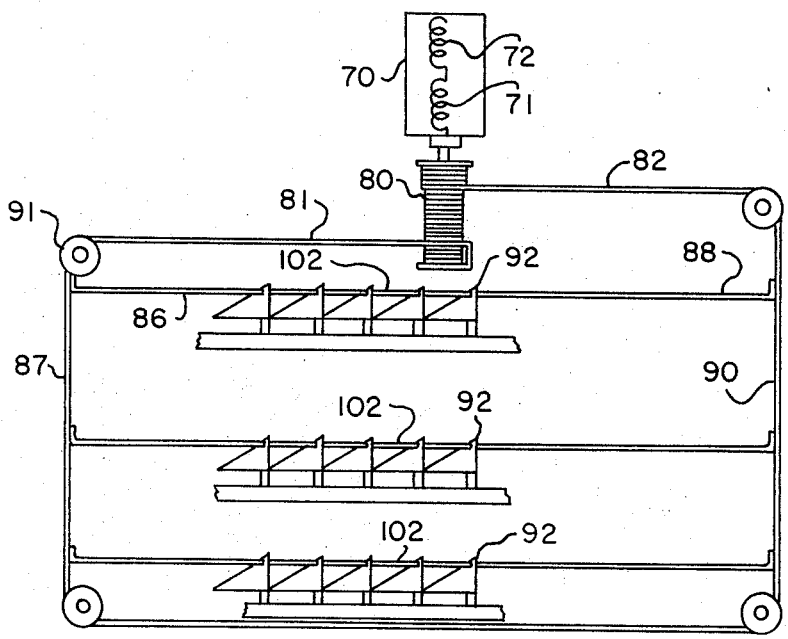
FIG. 3 is a diagram showing the drum and cables controlled by the relay.

FIG. 3 shows diagrammatically a rotatable drum 80 which has a cable 81 wound thereon at one end and a cable 82 wound thereon on the other end, the winding of the cable 81 and 82 being in opposite directions so that one winds and one unwinds. This can be one cable if desired.

The drum is driven by the reversing motor 70 as previously described.

The cables 81 and 82 branch at 86 and 87 on one end and at 88 and 90 on the other end, the branches running over suitable pulleys 91 and being connected at 92 in an operative way to the ventilating devices to open them or close them depending on whether cable 81 or 82 is pulling. Thus, the device opens or closes the ventilating louvers by pulling on cable 81 or 82 as desired. It will be evident that the cables cut off the motor in either direction by limit switches 73 or 74. These limit switches are capable of being adjusted to shut off the motor when the ventilators are partially open or completely open or partially or completely closed as desired. The limit switches limit the function of the motor in either direction and when one limit switch is open, the switch in the other direction is closed.

APPLICATION OF CONTROL DEVICE TO BARNS AND THE LIKE

The present invention is a further development on the subject matter involved in Wenger et al, U.S. application Ser. No. 104,976 for BUILDING FOR ANIMALS, filed Jan. 8, 1971, now pending in the U.S. Patent Office, and Wenger U.S. Pat. No. 3,556,055, issued Jan. 19, 1971 on application Ser. No. 809,234, filed Mar. 21, 1969 for BUILDING FOR ANIMALS, both of which, along with the previously mentioned U.S. application Ser. No. 146,043, parent to this, are incorporated herein by reference. This application is a continuation-in-part of application Ser. No. 250,986, now abandoned.

It is especially intended to be used in a building for animals such as found in the first mentioned application, and this also can be used with other buildings for animals which have the capability of control of sunlight and/or ventilation and/or water shedding, that is the closing of openings in the roof if there is likelihood of precipitation.

Where the control device in the winter mode is based on the sunlight, this can for example be used to admit large amounts of sunlight during sunny periods in the cold season, and to close the openings, partially or entirely, when the sun is not shining.

When the sensing device which applies to open and shut the louvers during the winter mode is based on temperature, it can, for example, be used to open ventilating access during periods of comparative heat during that mode, and close this partly or entirely when the temperature is less warm. Also, in winter it can close the louvers when weather of inclement type is encountered if the louvers are desired to be opened during the less severe cold.

Both these features of sun response and temperature response can be combined in one setup, so that there can be further regulation based on sunlight on the colder part of the winter mode, and with the addition, for example, of a manual switch to put the thermostatic control into operation of temperature control during the warmer part of that winter mode.

It will be evident that all this, as well as the already-described operation in the summer mode, can be done especially for example on the device of the above mentioned application Ser. No. 104,976 that is now pending.

Especially in some places where the wind is especially likely to be irregular and to be disturbing factor in the regulation of the well being of the animals in the building, as, for example, where mountain conditions may control prevailing winds, the wind direction or pressure regulator may be available and pretinent for use, especially in the winter mode. This and the other controls are especially important in eliminating or reducing the tendency toward fouling of the air in view of the presence of the large number of animals in a comparatively small space. The wind control can, for example, be used to close the louvers of a building like that in the pending application, when a wind is coming fron an unusual or undesirable direction irregularly to the placement of the building, as, for example when the wind is continuing to blow in in strength into the louvers themselves and then into the building. This would be especially important in the cooler weather.

In what is said above, it is not intended to limit the application of the invention to a building of the type and orientation described in the patent and application Ser. No. 104,976, but it also applies to animal buildings of other types and orientations which have louvers or other means of admitting sun or air or both or water vapor and the like and other such things.

EXAMPLE OF APPLICATION TO AN ANIMAL BUILDING

Figure 4:
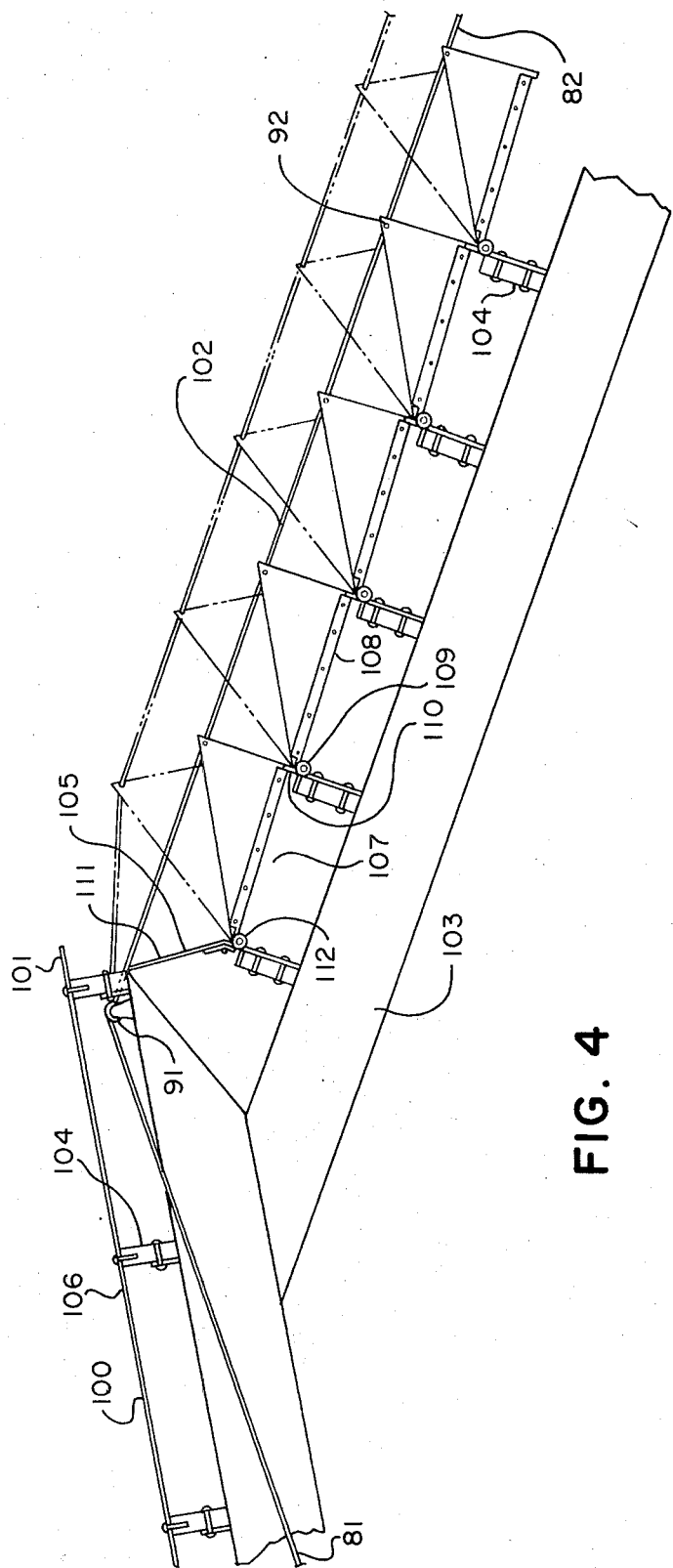
FIG. 4 is a fragmentary vertical section showing the animal building and the louvers of the invention and the application of the control to the louver covers.

In FIG. 4 the building has a ridge roof having a greater roof portion 100 running to a ridge 101 and a lesser roof portion 102. The roof is supported by roof beams 103 on which beams or nailers 104 extend longitudinally of the roof. At the ridge 101 the greater roof section 100 is above the lesser roof section 102 to provide a vent 105 which can be used to ventilate the interior of the building. The permanent roof sections are made by securing sheets 106 of metal or the like to the nailers. At suitable points along the greater roof section there may be a sky light. The lesser roof section is preferably disposed toward the south and has at suitable points running transverse to the slope of the roof louvers 107 having covers 108 preferably of metal or a suitable sheet material, conveniently hinged at 109 and closing with respect to the lower louver in closed position at 110, controlled by cables 81 and 82 suitably fastened to each louver at 92 as already described. The vent 105 is preferably closed by a vent cover 111 hinged at 112, suitably controlled manually.

In the specific embodiment of the circuit of FIGS. 1 and 2, the following dimensions of components are desirable for a specific embodiment.

| | |
|---|---|
| Output of Power Pack | 12 volts |
| Filtering Capacitor | 1500 microfarads |
| Comparative Size of Potentiometer Resistors | |
| Resistor 40 | 500,000 ohms |
| Resistor 41 | 1 megaohm |
| Timing Capacitor | 1500 microfarads |
| Resistor 46 | 6800 ohms |
| Resistor 48 | 820,000 ohms |
| Resistor 50 | 100,000 ohms |
| Resistor 63 | 680,000 ohms |
| Resistor 64 | 330 ohms |
| Resistor 65 | 4700 ohms |

It will be understood that while I have often described the louvers herein as ventilating louvers, they may at appropriate times in appropriate weahter also have the effect of admitting or shutting out sunlight, and especially so when the roof in which they are located slopes downward more or less toward the south, as would be most usual. Rain may also be shut out.

It will also be understood that while I have described certain controls, modes or the like by terms like winter and summer, the actual thing for which they will be adjusted is for colder conditions on the one hand and warmer on the other, and in accordance with what is required in the building involved. Thus, conceivably the so-called summer mode might in a given climate with a given building go into operation in a mild part of winter, and the so-called winter mode might in a given climate with a given building go into operation in a cold part of summer, and it would depend upon the adjustment and the weather what would be operating at a given time in spring or fall.

It is somewhat similar as to controls or modes or the like which I have denominated as "night" or "day". The particular hours that would actually be involved would depend upon how the timer was set to get the best results. For example, the timer would most usually in a given case be set so as to include some early part of morning and possibly also some late part of afternoon, when the sun was especially low and ineffective, in the so-called "night" operation.

In view of my invention and disclosure, variations and modifications to meet individual whim or particular need will doubtless become evident to others skilled in the art, to obtain all or part of the benefits of my invention without copying the mechanism shown, and I therefore claim all such insofar as they fall within the reasonable spirit and scope of my claims.

Having thus described my invention, what I claim as new and desire to secure by Letters Patent is:

1. In a control mechanism for controlling ventilation, a thermostatic switch having a winter mode and a summer mode, a sensing element having a variable resistor connected to the thermostatic switch in the winter mode, responding to an electrical quantity which dominates the control, a transistor switching mechanism energized and connected to the sensing resistor in the winter mode to respond to its change in resistance, a relay connected to the output side of the transistor switching mechanism, a series of ventilators, means for energizing the relay and when this occurs to operate the ventilators, a timer switch energized in the summer mode, operatively connected to a rain switch, means for opening the ventilators in the summer mode if the timer switch indicates night and the rain switch indicates fair weather, means for closing the ventilators in the summer mode if the timer switch indicates night and the rain switch indicates precipitation, and means for closing the ventilators in the summer mode if the timer switch indicates day.

2. In a mechanism of claim 1, having for the winter mode interposed electrically between the sensing resistor and the transistor switching mechanism, a time delay network for delaying the response of the transistor switching mechanism, the transistor switching mechanism including a PNP junction transistor and a NPN junction transistor, the input side of the switching mechanism being connected with the collector of the PNP junction transistor and the base of the PNP junction transistor being also connected to the input, the output side of the transistor switching mechanism being connected with the collector of the NPN junction transistor and the base of the PNP junction transistor being connected also to the output, the respective emitters of the transistors being connected to the high and low side of the power source.

3. A mechanism of claim 2, in which the time delay network includes a time delay capacitor and time delay resistors, a first time delay resistor being connected in series with the capacitor between the sensing resistor and the input of the switching transistors, and a second time delay resistor being connected in parallel with a condenser and in series with the first time delay resistor.

4. A mechanism of claim 3, in which the first and second time delay resistors are part of a potentiometer which includes means for increasing and reducing their resistance in unison.

5. A mechanism of claim 4, in which the time delay network also includes a third time delay resistor in parallel with the first time delay resistors and with the capacitor.

6. A mechanism of claim 5, in which the time delay network also includes a fourth time delay resistor and a fifth time delay resistor which are in series with the first time delay resistor and in parallel with the capacitor, and the second time delay resistor, the input of the switching transistors being connected between the fourth and fifth time delay resistors.

7. A mechanism of claim 6, in which the switching transistor mechanism includes a first PNP junction transistor, a second NPN junction transistor and a third PNP junction transistor, and first, second and third switching resistors, the first transistor being connected with its collector on the input side, its emitter connected through the first switching resistor to the high side of the power source and its base connected through the second switching resistor to the base of the third switching resistor, the second switching transistor having its base connected to the input, its emitter connected to the grounded side of the power source, and its collector connected to the second switching resistor and through it to the base of the third switching transistor, the third switching resistor being connected between the base of the third switching transistor and the high side of the power source, the emitter of the third switching resistor being connected to the high side of the power source, and the collector of the third switching transistor, being connected to one side of the relay.

* * * * *